US009840169B2

(12) United States Patent
Mason et al.

(10) Patent No.: US 9,840,169 B2
(45) Date of Patent: Dec. 12, 2017

(54) CHILD SAFETY SEAT

(71) Applicant: BP CHILDREN'S PRODUCTS HK CO., LIMITED, Wanchai (HK)

(72) Inventors: Kyle S. Mason, West Lawn, PA (US); James M. F. Hutchinson, Mohnton, PA (US)

(73) Assignee: BP Children's Products HK Co., Limited, Hong Kong (HK)

( * ) Notice: Subject to any disclaimer, the term of this patent is extended or adjusted under 35 U.S.C. 154(b) by 0 days.

(21) Appl. No.: 15/262,579

(22) Filed: Sep. 12, 2016

(65) Prior Publication Data
US 2016/0375804 A1   Dec. 29, 2016

Related U.S. Application Data

(62) Division of application No. 13/445,974, filed on Apr. 13, 2012, now abandoned.

(60) Provisional application No. 61/517,215, filed on Apr. 15, 2011, provisional application No. 61/520,242, filed on Jun. 7, 2011, provisional application No. 61/629,059, filed on Nov. 10, 2011.

(51) Int. Cl.
*B60N 2/28* (2006.01)

(52) U.S. Cl.
CPC ......... *B60N 2/2887* (2013.01); *B60N 2/2806* (2013.01); *B60N 2/286* (2013.01); *B60N 2/2821* (2013.01); *B60N 2/2863* (2013.01); *B60N 2/2872* (2013.01); *B60N 2/2875* (2013.01)

(58) Field of Classification Search
CPC .... B60N 2/2887; B60N 2/286; B60N 2/2863; B60N 2/2872; B60N 2/2875

USPC ......................................................... 297/253
See application file for complete search history.

(56) References Cited

U.S. PATENT DOCUMENTS

| 6,543,846 B2 * | 4/2003 | Cone ................ B60N 2/2806 297/253 X |
| 6,592,183 B2 | 7/2003 | Kain |
| 6,863,345 B2 | 3/2005 | Kain |
| 7,044,548 B2 | 5/2006 | Mullen et al. |
| 7,278,684 B2 | 10/2007 | Boyle |

FOREIGN PATENT DOCUMENTS

WO         9715469 A1    5/1997

OTHER PUBLICATIONS

Office Action of co-pending Chinese Patent Application No. 201210109251.4 dated Aug. 20, 2015.

* cited by examiner

*Primary Examiner* — Anthony D Barfield
(74) *Attorney, Agent, or Firm* — Baker & McKenzie LLP; David I. Roche

(57) ABSTRACT

A child safety seat includes a seat shell having a side provided with an elongated slot, an anchor strap portion routed through the seat shell, and a retractor disposed on the side of the seat shell. The anchor strap portion is movable back and forth along the elongated slot relative to the seat shell, the anchor strap portion being connected with a fastener operable to attach with an anchor structure provided in a vehicle. Moreover, the anchor strap portion has one end assembled with the retractor, the fastener being connected with the anchor strap portion at a location between the elongated slot and the retractor.

18 Claims, 14 Drawing Sheets

CHILD SAFETY SEAT

CROSS-REFERENCE TO RELATED APPLICATIONS

This application is a divisional of U.S. patent application Ser. No. 13/445,974 filed on Apr. 13, 2012, now abandoned, which respectively claims priority to U.S. Provisional Patent Application No. 61/517,215 filed on Apr. 15, 2011; to U.S. Provisional Patent Application No. 61/520,242 filed on Jun. 7, 2011; and to U.S. Provisional Patent Application No. 61/629,059 filed on Nov. 10, 2011, which are all incorporated herein by reference.

BACKGROUND

1. Field of the Invention

The present invention relates to child safety seats.

2. Description of the Related Art

Conventionally, an automobile vehicle has seatbelts provided at the front and rear seats. The seatbelt generally includes shoulder and lap straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. As a result, safety legislations require the use of a child safety seat for seating a young child in a vehicle.

In some approaches, the seatbelt of the vehicle can be used to hold the child safety seat in place. In other approaches, the child safety seat can be provided with an independent restraint system that can attach with an anchor structure of the vehicle to hold the child safety seat in place. Depending on the age of the child, the child safety seat can also be installed in the vehicle in a position facing forward or a position facing rearward. Each of these two positions requires a different procedure for securing the child safety seat, which may be subject to confusion and erroneous manipulation from the caregiver.

Therefore, there is a need for a construction that can facilitate the installation of the child safety seat in the vehicle and address at least the foregoing issues.

SUMMARY

The present application describes a child safety seat that is provided with a restraint system for attaching the child safety seat in a vehicle. The child safety seat includes a seat shell having a side provided with an elongated slot, an anchor strap portion routed through the seat shell, and a retractor disposed on the side of the seat shell. The anchor strap portion is movable back and forth along the elongated slot relative to the seat shell, the anchor strap portion being connected with a fastener operable to attach with an anchor structure provided in a vehicle. Moreover, the anchor strap portion has one end assembled with the retractor, the fastener being connected with the anchor strap portion at a location between the elongated slot and the retractor.

At least one advantage of the structures described herein is the ability to conveniently adjust the positions of the anchor strap portions by pulling the strap portions along the seat shell toward its front or rear. Accordingly, the installation of the child safety seat in a vehicle can be facilitated, and erroneous manipulation can be prevented.

DETAILED DESCRIPTION OF THE EMBODIMENTS

The present application describes a child safety seat that is provided with a restraint system for attaching the child safety seat in a vehicle. The restraint system is mounted with a seat shell of the child safety seat, and can be conveniently adjusted according to the installation of the child safety seat in either of a forward facing position and a rearward facing position.

Figure 1:
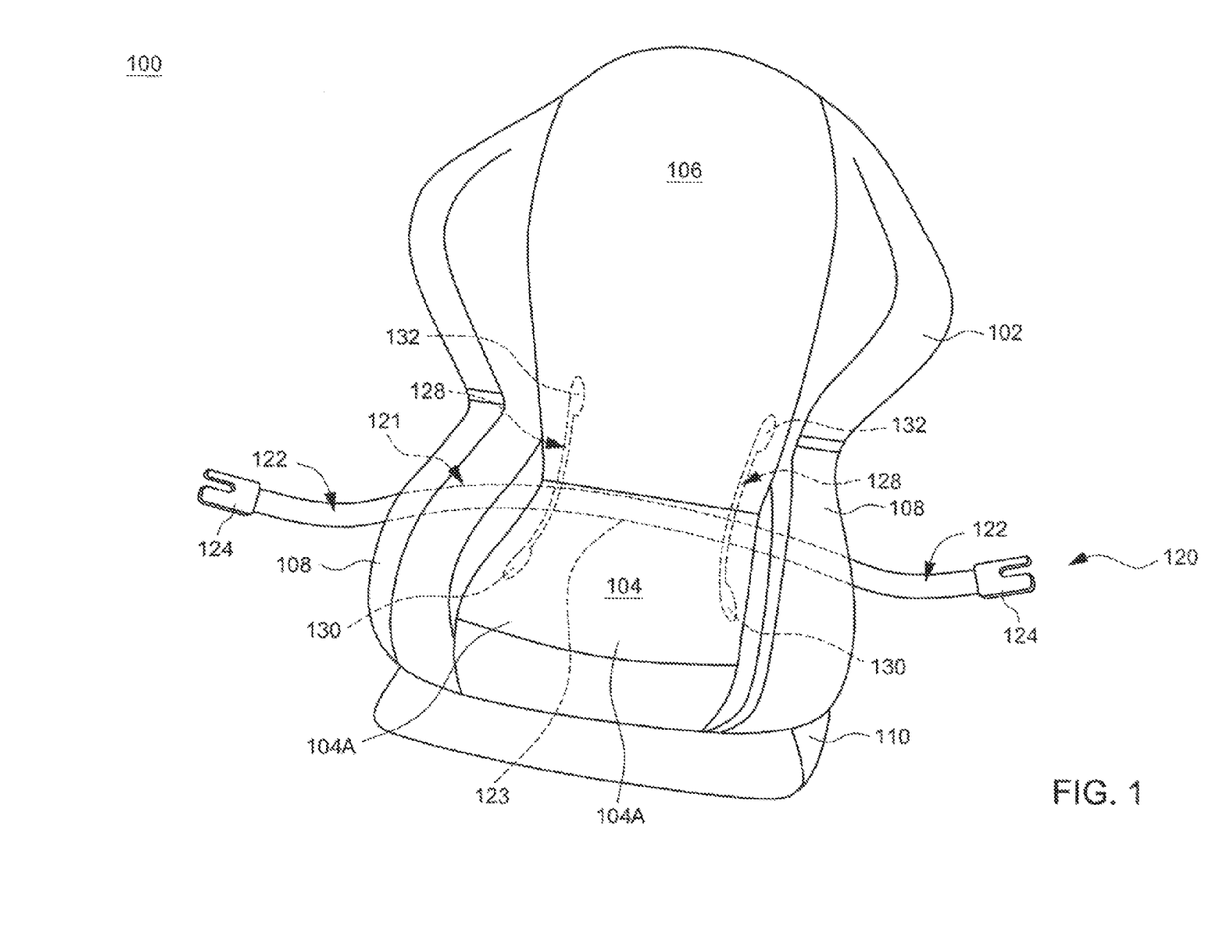
FIG. 1 is a perspective view illustrating an embodiment of a child safety seat.

FIG. 1 is a perspective view illustrating an embodiment of a child safety seat 100. The child safety seat 100 can have a seat shell 102. The seat shell 102 can include a seating portion 104, a seatback 106, and lateral guards 108 raised parallel to each other at left and right sides of the seat shell 102. The seating portion 104 can have an upper seating surface 104A on which a child can be placed in a sitting position. To provide comfortable sitting, soft materials (e.g., fabric, foam materials and the like) can be used to cushion the seating surface 104A.

In some embodiments, the seat shell 102 can also be used in association with a base 110. The base 110 can rest at the bottom of the seating portion 104 to provide stable support. It is noted that the base 110 can be optional, and alternate embodiments may use the child safety seat 100 alone without the base 110.

The lateral guards 108 raised at the left and right sides can extend from the front to the rear of the seat shell 102. The lateral guards 108 can act to provide lateral protection and restrict lateral movements of the child.

Referring again to FIG. 1, the child safety seat 100 can also include a restraint system 120 mounted with the seat shell 102. When the child safety seat 100 is installed in a vehicle, the restraint system 120 can attach with an anchor structure provided in a vehicle to hold the seat shell 102 in place. As shown, the restraint system 120 can include a strap assembly 121 restrictedly held with the seat shell 102 and having two anchor strap portions 122 respectively extending outward from left and right sides of the seat shell 102. A distal end of each anchor strap portion 122 lying outside the seat shell 102 can be assembled with a fastener 124 adapted to engage with an anchor structure 126 of a vehicle (better shown in FIGS. 4 and 5) for holding the child safety seat 100 in place. Examples of the fasteners 124 can include connectors compatible with the International Standards Organization FIX (ISO-FIX) for installing child seats into cars, or general latch hooks.

Figure 2:
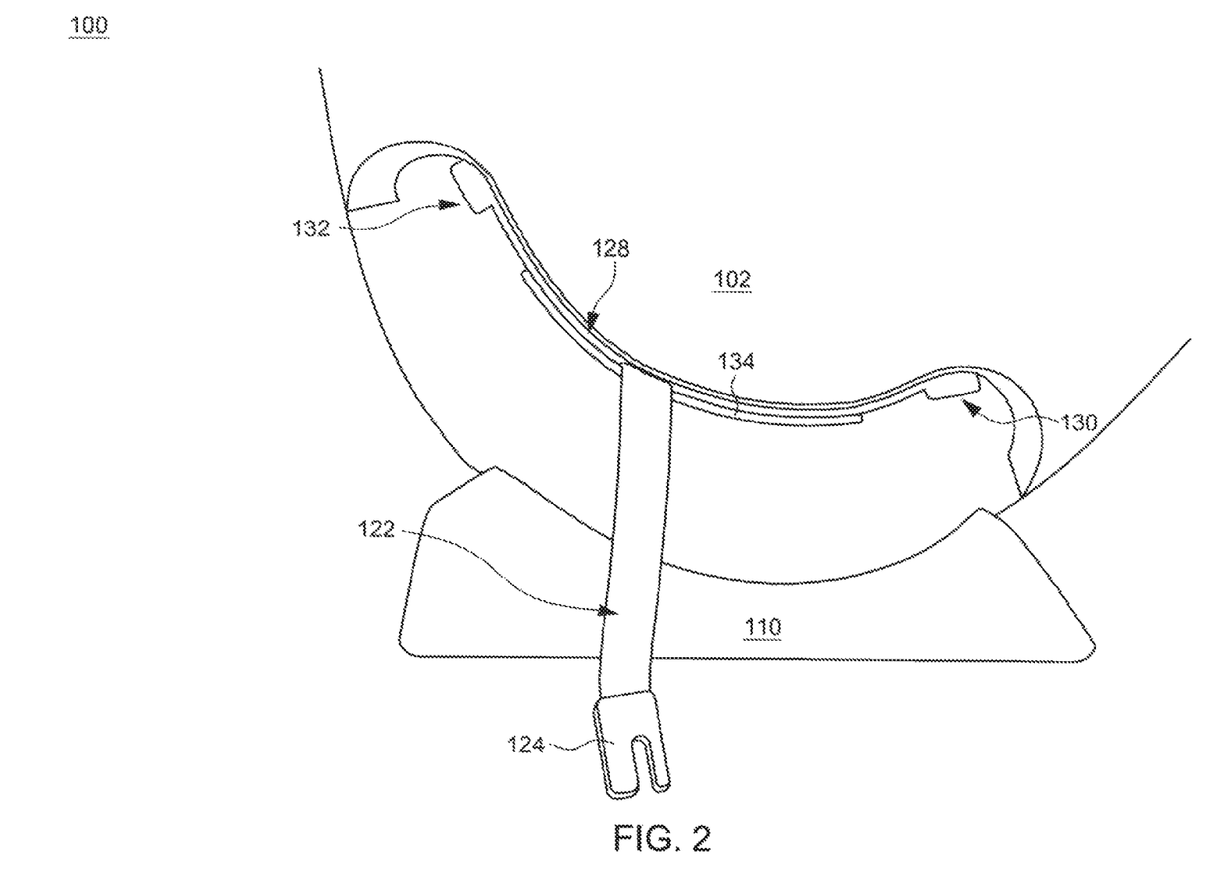
FIG. 2 is a partially enlarged side view of the child safety seat shown in FIG. 1.
Figure 3:
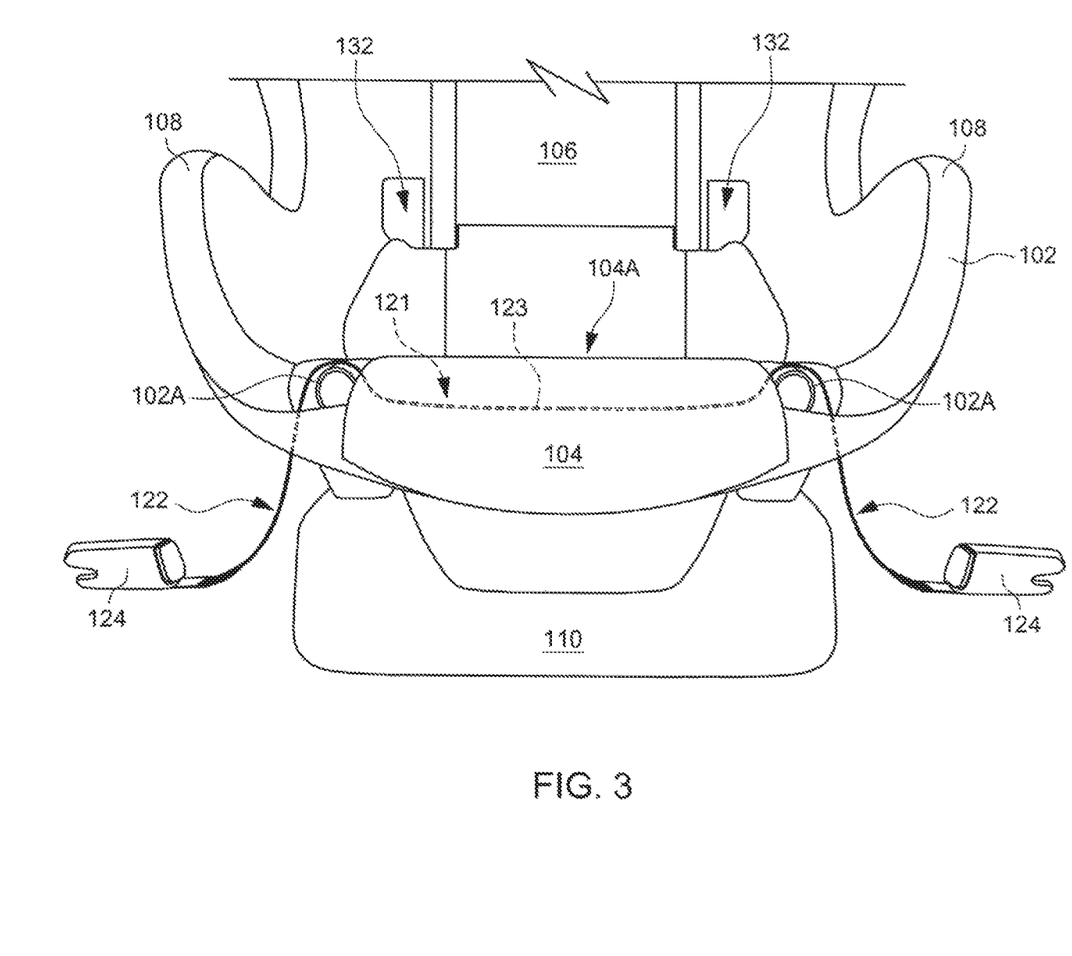
FIG. 3 is a schematic view illustrating the routing of a strap assembly through an interior of the seat shell.

In conjunction with FIG. 1, FIG. 2 is a partially enlarged side view of the child safety seat 100, and FIG. 3 is a schematic view illustrating the routing of the strap assembly 121 through an interior of the seat shell 102. The seat shell 102 can include a frame structure comprised of two beams 102A that extend along two sides of the seating portion 104 near the lateral guards 108. In one embodiment, the strap assembly 121 can include a strap 123 made of a single continuous web material that has two opposite end portions respectively forming the anchor strap portions 122. In alternate embodiments, the strap assembly 121 can include two distinct straps, each of which has a first end assembled in the interior of the seating portion 104 (e.g., the first ends of the two distinct straps may be operatively connected with each other), and a free second end extending outside the seat shell 102 to form one anchor strap portion 122. The strap assembly 121 can be routed transversally through the seating portion 104 and under the seating surface 104A, wrap around the two beams 102A, and extend outward from the left and right sidewalls of the seat shell 102.

The seat shell 102 can include two slots 128 respectively formed at left and right sides of the seating portion 104 and under the seating surface 104A for passage of the anchor strap portions 122. Each slot 128 can have an elongated profile that respectively communicates with a first opening 130 near the front of the seat shell 102, and a second opening 132 near the rear of the seat shell 102. In one embodiment, the two slots 128 may be symmetrically formed with a curved shape at the left and right sides of the seating portion 104. The two anchor strap portions 122 can respectively extend outside the seat shell 102 through the two slots 128. Moreover, the two anchor strap portions 122 can be movably adjusted to travel along the two slots 128 to two opposite positions for attaching the child safety seat 100 in a rearward facing configuration and a forward facing configuration, respectively.

To facilitate the adjustment of the anchor strap portions 122, an elongated rib 134 of a suitably curved shape can be formed adjacent to a lower side of each slot 128. Preferably, the elongated rib 134 is convex outward in the middle portion. When the anchor strap portion 128 is tightened, the rib 134 can contact and guide the anchor strap portion 128 to slip to the correct position.

Figure 4:
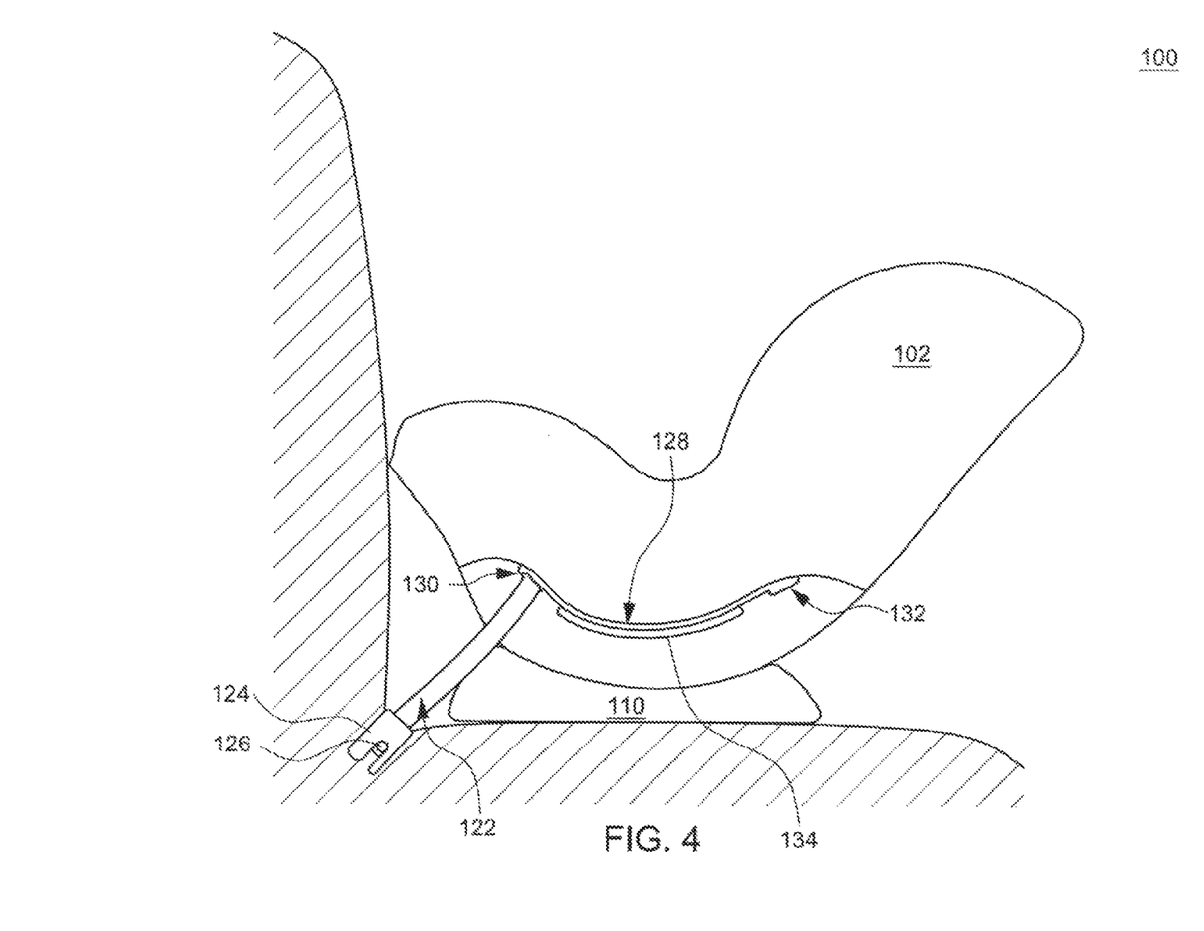
FIG. 4 is a side view illustrating the child safety seat in a rearward configuration of use.
Figure 5:
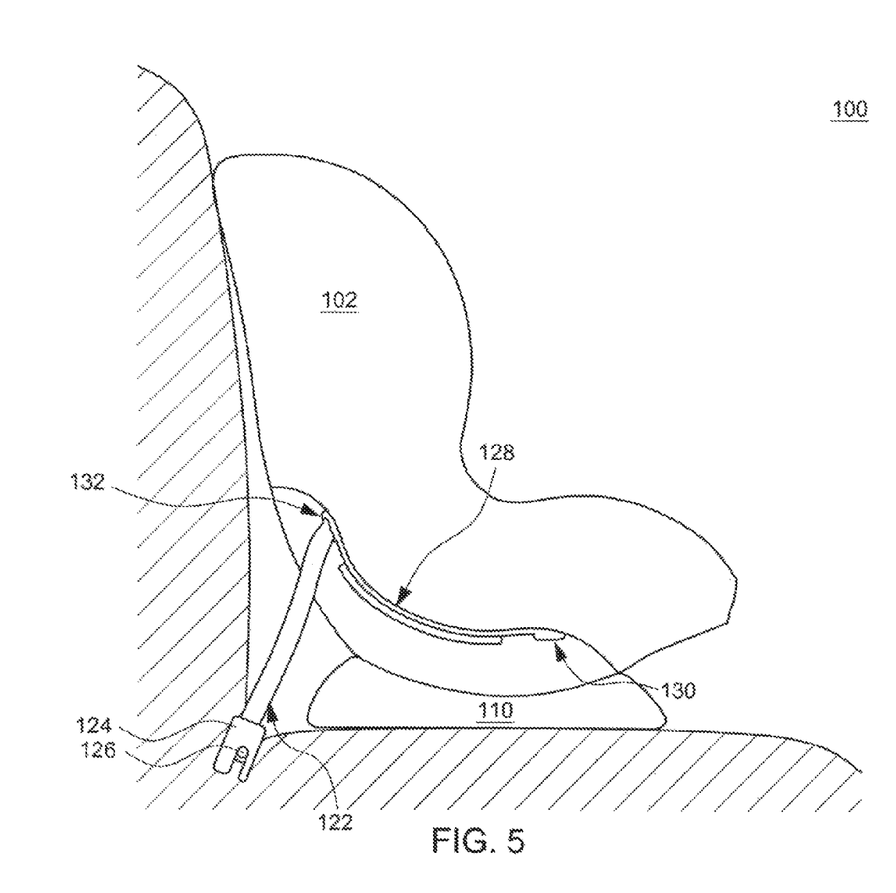
FIG. 5 is a side view illustrating the child safety seat in a forward configuration of use.

FIGS. 4 and 5 are side views respectively illustrating the child safety seat 100 installed in rearward and forward configurations of use. When the child safety seat 100 is installed in the rearward facing configuration (i.e., the front of the child safety seat 100 is facing a rear of the vehicle) as shown in FIG. 4, each anchor strap portion 122 can be positioned adjacent to the first opening 130. In this position, each anchor strap portion 122 can extend through the associated first opening 130 toward the front of the child safety seat 100 for attaching with the anchor structure 126 of the vehicle.

When the child safety seat 100 is installed in the forward facing configuration (i.e., the front of the child safety seat 100 is facing a front of the vehicle) as shown in FIG. 5, each anchor strap portion 122 can be moved along the corresponding slot 128 until it reaches a position adjacent to the second opening 132. In this position, each anchor strap portion 122 can extend through the second opening 132 toward the rear of the child safety seat 100 for attaching with the anchor structure 126 of the vehicle.

Figure 6:
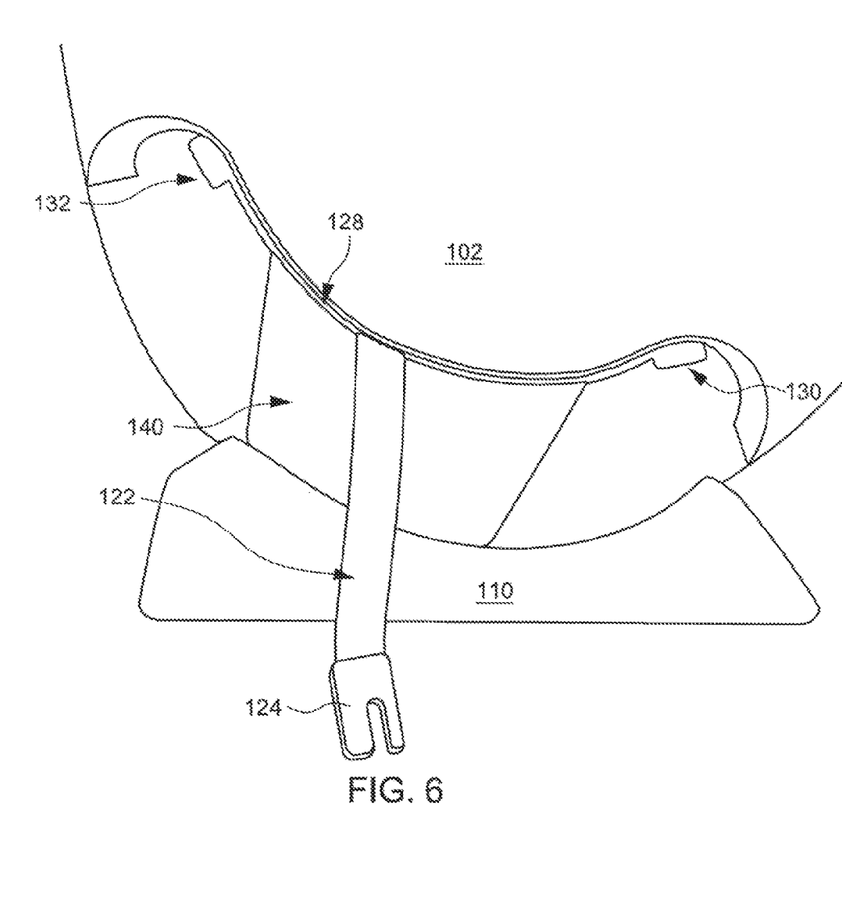
FIGS. 6 and 7 are schematic views illustrating a variant embodiment of the child safety seat that can allow convenient storage of anchor strap portions and fasteners.
Figure 7:
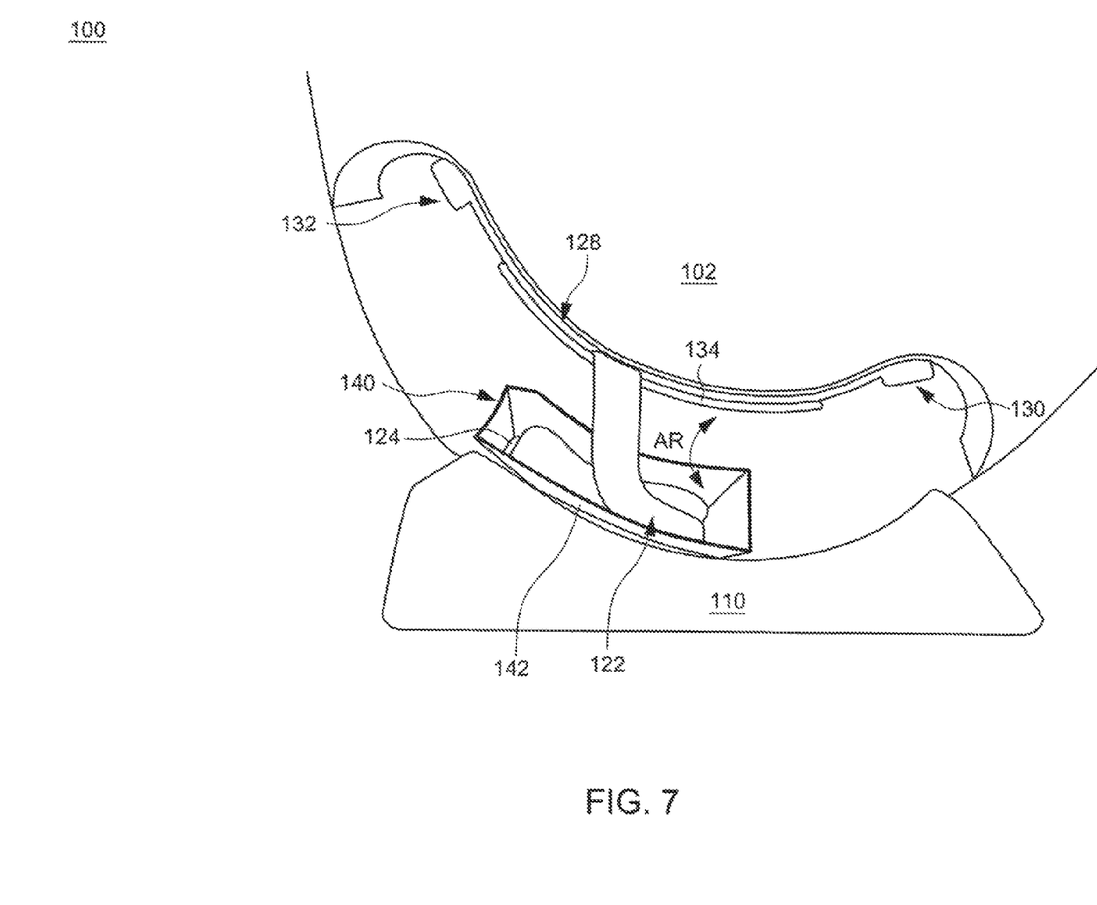

FIGS. 6 and 7 are schematic views illustrating a variant embodiment of the child safety seat 100 that can allow convenient storage of the anchor strap portions 122 and fasteners 124. One or two of the left and right sides of the seat shell 102 can be respectively provided with a storage pocket 140 in which the fastener 124 and associated anchor strap portion 122 can be conveniently disposed. The storage pocket 140 can be arranged adjacently below the slot 128 and between the first and second openings 130 and 132. In one embodiment, the storage pocket 140 can be formed as a box 142 that has an upper opening. The box 142 can be movably assembled at the side of the seat shell 102, for example, pivotally assembled or formed as a drawer on the seat shell 102. The box 142 can have a shape that can fit with the contour of the seat shell 102. As shown with arrow AR in FIG. 7, the box 142 can be pulled outward so as to expose its upper opening, and pushed toward the seat shell 102 to engage with the seat shell 102 and obstruct its upper opening smoothly conforming to the contour of the seat shell 102.

FIG. 7 shows the use of the storage pocket 140 for storing the anchor strap portion 122 and fastener 124. The storage pocket 140 can be opened, and the anchor strap portion 122 can be placed at an intermediate position of the slot 128. The fastener 124 and the anchor strap portion 122 then can be disposed in the storage pocket 140, which can be subsequently closed on the side of the seat shell 102. Accordingly, the fastener 124 and the anchor strap portion 122 can be conveniently concealed in the storage pocket 140 associated therewith, which can improve the outer aesthetic appearance of the child safety seat 100.

When it is used outside the storage pocket 140, the anchor strap portion 122 can travel along the slot 128 and above the storage pocket 140, which does not impede the adjustment of the anchor strap portion 122.

It is worth noting that the storage pocket 140 can be implemented with different constructions of the seat shell 102. For example, in alternate embodiments, the storage pocket 140 can also be provided in a seat shell that has no slots 128, at a location between the first openings 130 and second openings 132 like previously described. In this case, the anchor strap portions 122 can be respectively withdrawn from the first openings 130 (or second openings 132) and routed through the second openings 132 (or first openings 130) from the interior of the seat shell 102. When the anchor strap portions 122 are placed through the first openings 130 or second openings 132, the fasteners 124 and parts of the anchor strap portions 122 when unused can be conveniently disposed in the storage pockets 140.

Figure 8:
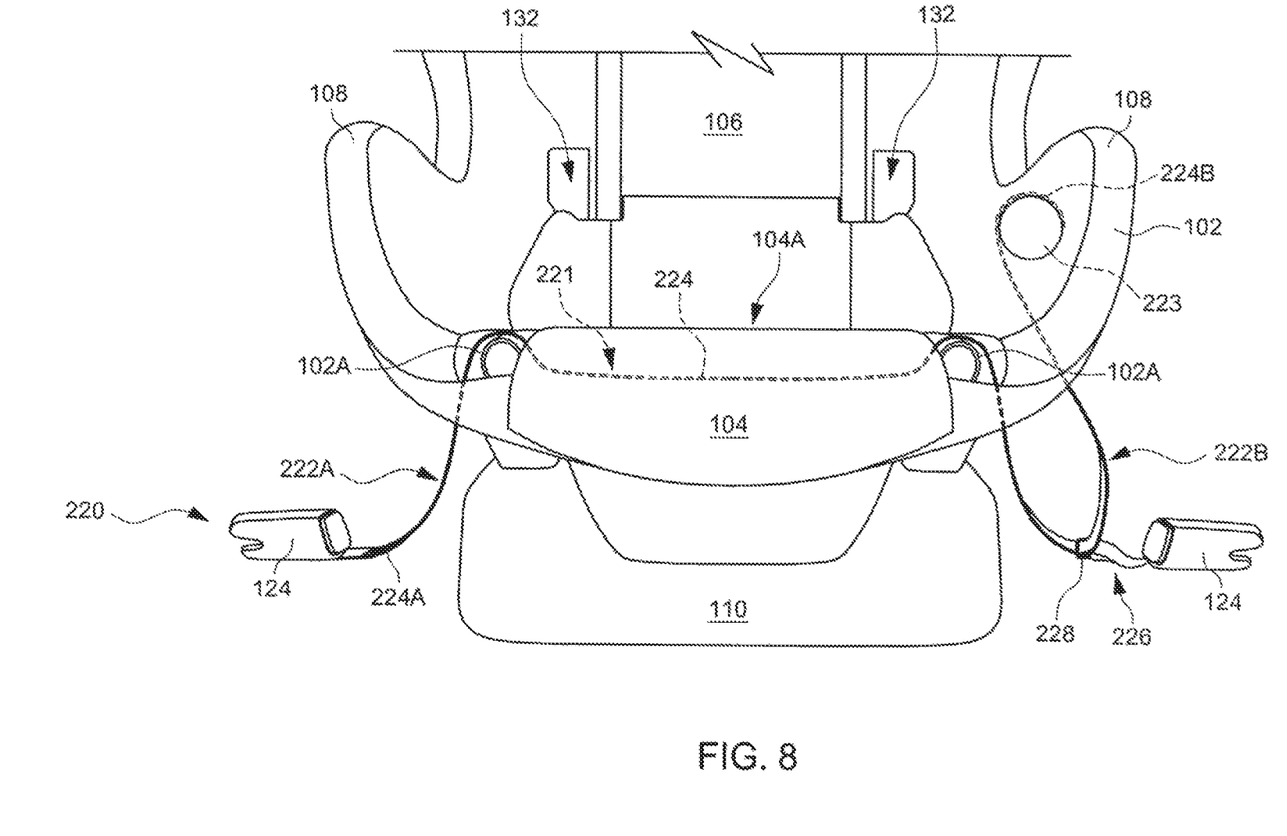
FIGS. 8 and 9 are schematic views illustrating another embodiment of a restraint system implemented in a child safety seat.
Figure 9:
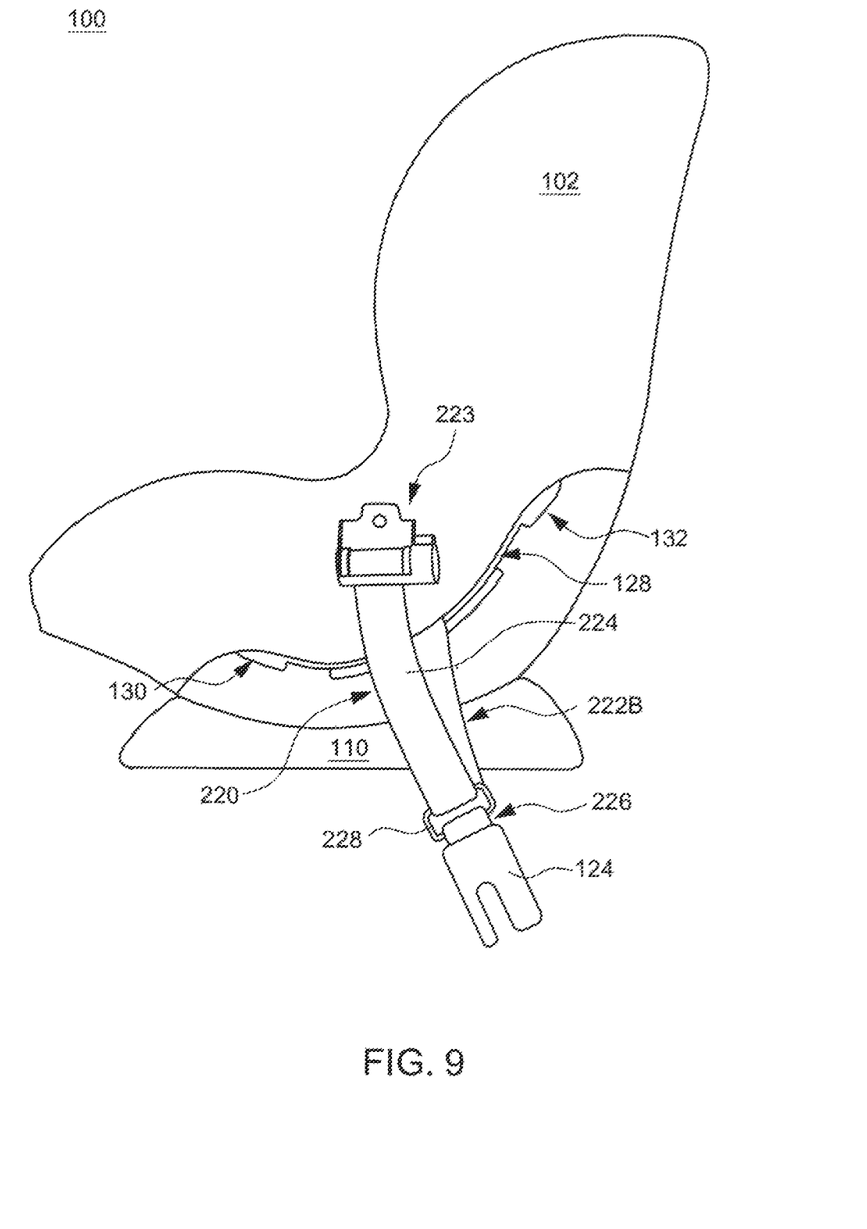

FIGS. 8 and 9 are schematic views illustrating another embodiment of a restraint system 220. To facilitate tightening of the first and second anchor strap portions 222A and 222B, the restrain system 220 can include a retractor 223. The retractor 223 can be movably assembled at one side (e.g., left or right side) of the seat shell 102 at a location above the slot 128 and between the first and second openings 130 and 132. In one embodiment, the retractor 223 can be pivotally assembled with the seat shell 102. In alternate embodiments, other movable assemblies may be applicable, e.g., sliding connection that allows displacements of the retractor 223 toward the front or rear of the seat shell 102.

In this embodiment, the strap assembly 221 of the restraint system 220 can include a strap 224 made of a continuous web material, and an extension 226 movably connected with the strap 224. The strap 224 can be transversally routed through the two slots 128 of the seat shell 102, have a first end 224A assembled with one fastener 124 at a first outer side of the seat shell 102, and have a second end 224B connected with the retractor 223 at an opposite second outer side of the seat shell 102. The extension 226 can exemplary include a connector 228 that is connected with one fastener 124, and can slide along the strap 224 outside the seat shell 102 on the side of the retractor 223. Accordingly, a free end portion of the strap 224 that is affixed with one fastener 124 can form a first anchor strap portion 222A extending outward from a first side of the seat shell 102. A second anchor strap portion 222B extending outward from an opposite second outer side of the seat shell 102 can include the extension 226 affixed with one fastener 124, and a portion of the strap 224 adjacent to the extension 226 and having one end assembled with the retractor 223. Accordingly, the fastener 124 can be slidably disposed on the anchor strap portion 222B between the slot 128 and the retractor 223 located at the same side.

Figure 10:
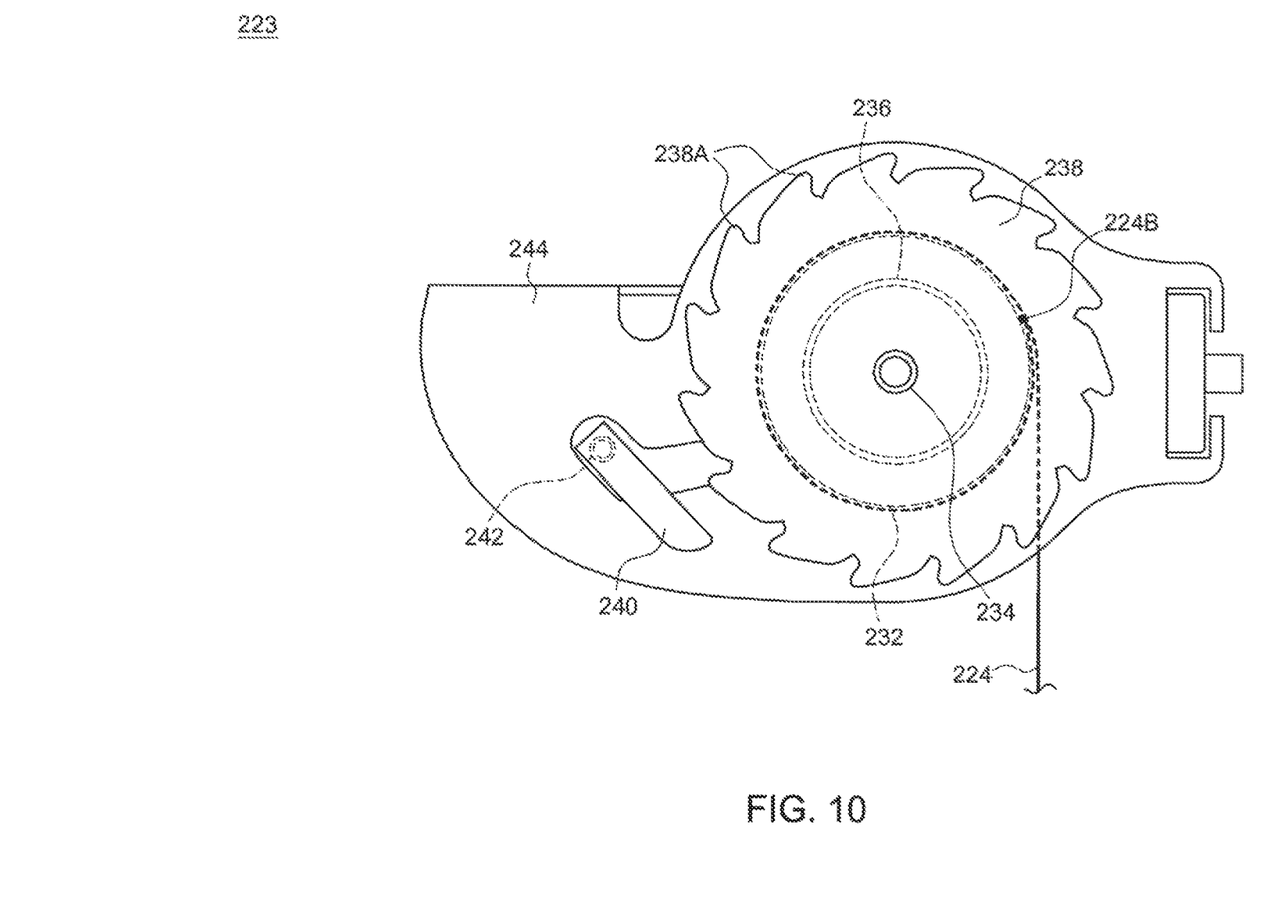
FIG. 10 is a schematic view illustrating an embodiment of a retractor implemented in the restraint system shown in FIGS. 8 and 9.

FIG. 10 is a schematic view illustrating an embodiment of the retractor 223. The retractor 223 can include a drum 232 pivotally connected around a shaft 234 affixed with the seat shell 102, a motor spring 236 (shown with dashed lines) connected between the drum 232 and a fixed portion, ratchet wheels 238 having a plurality of teeth 238A and respectively connected with two opposite sides of the drum 232, two pawls 240, and biasing springs 242 respectively coupled with the pawls 240 (only one side of the drum 232 with one ratchet wheel 238, one pawl 240 and one biasing spring 242 is represented in FIG. 10, the other side being similar in construction). The biasing springs 242 can be pivotally mounted with a frame 244 that is pivotally assembled with the seat shell 102.

The drum 232 can be biased by the motor spring 236 (e.g., torsion spring) in rotation to wind and take up the strap 224. Each of the pawls 240 can be urged by the associated biasing spring 242 to engage with any of the teeth 238A of the corresponding ratchet wheel 238 for blocking rotation of the drum 232 in a reverse direction that unwinds the strap 224 (the pawl 240 shown in FIG. 10 is exemplary shown in a disengaged state).

Figure 11:
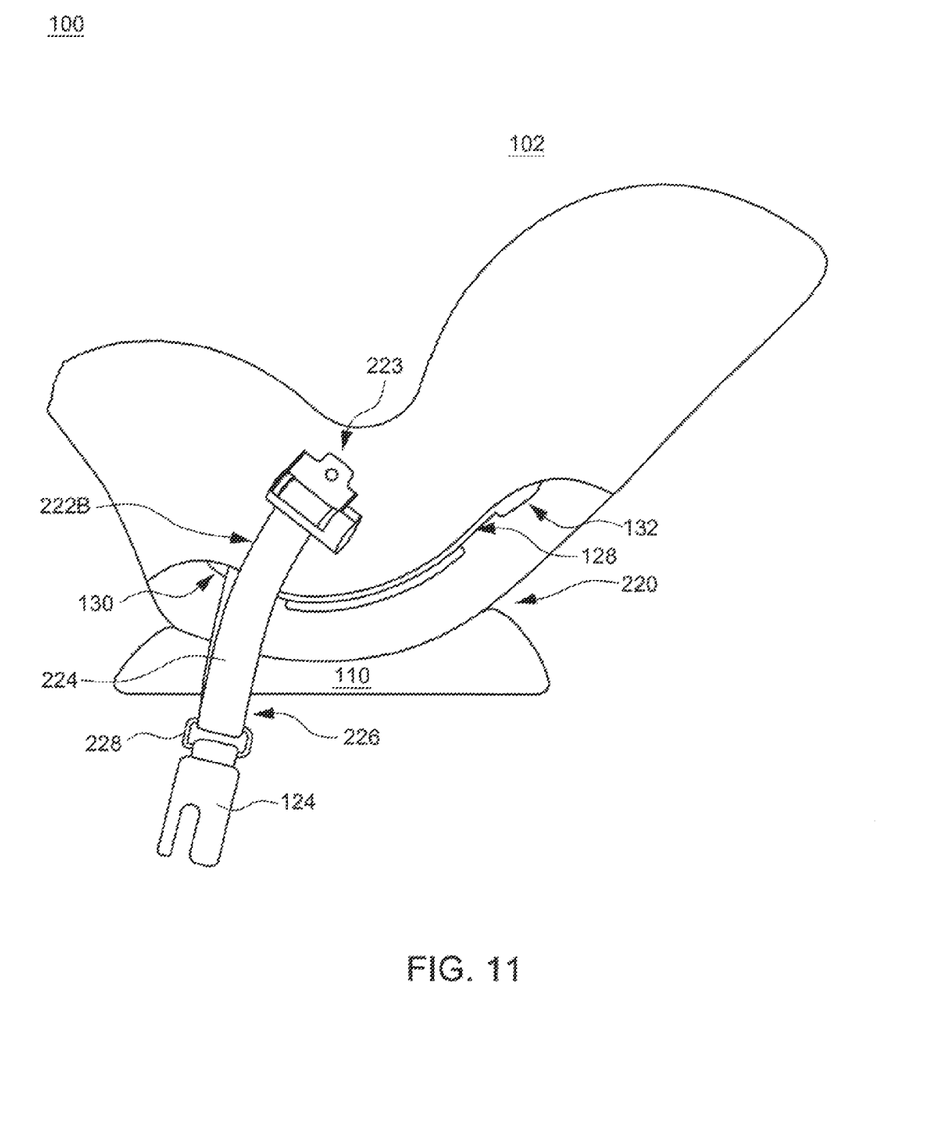
FIG. 11 is a schematic view illustrating the retractor adjusted to a rearward facing configuration of use of the child safety seat.
Figure 12:
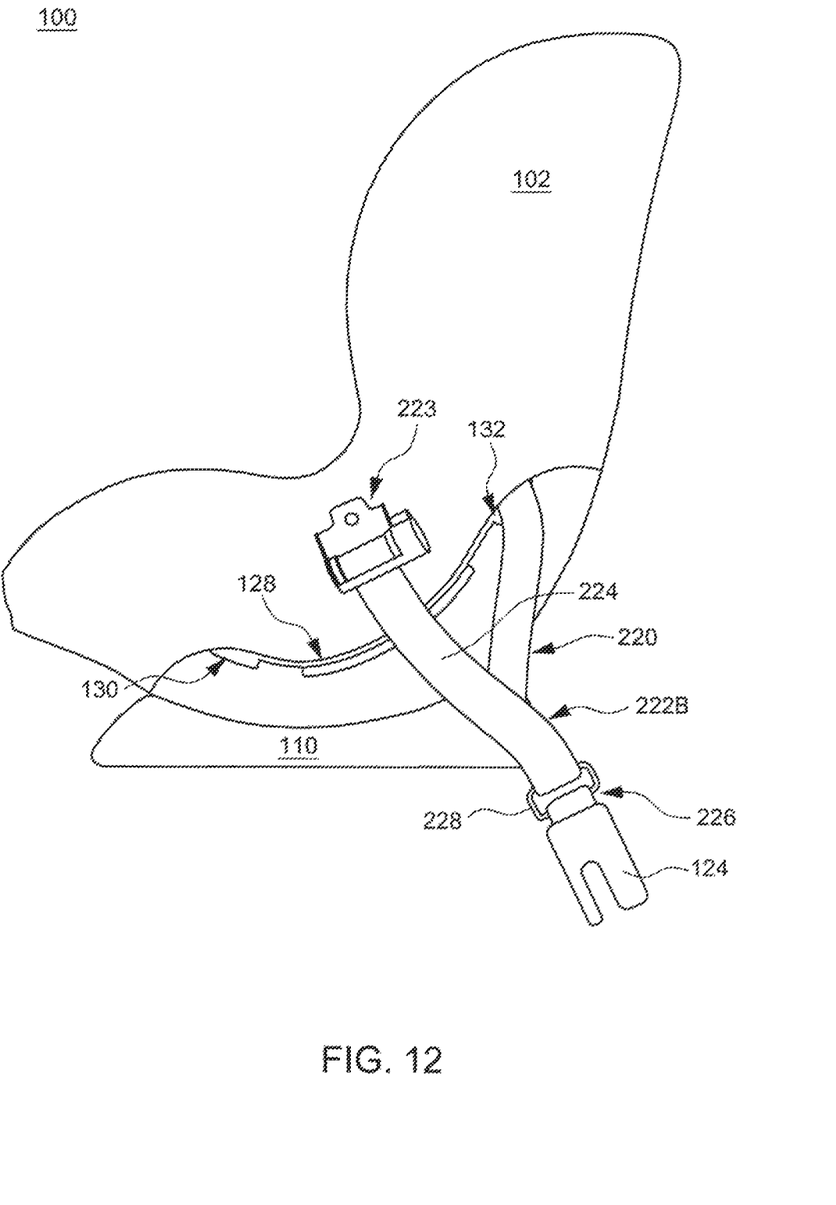
FIG. 12 is a schematic view illustrating the retractor adjusted to a forward facing configuration of use of the child safety seat.

As shown in FIGS. 11 and 12, the retractor 223 can rotate relative to the seat shell 102 to adapt with the adjustment of the two anchor strap portions 222A and 222B either adjacent to the first openings 130 or second openings 132. Once the anchor strap portions 222A and 222B are adequately positioned, the pawls 240 can be actuated to respectively disengage from the ratchet wheels 238, after which the anchor strap portions 222A and 222B can be pulled to attach with the anchor structure of the vehicle. Once the fasteners 124 are attached, the motor spring 236 can act to properly tension the anchor strap portions 222A and 222B. Moreover, the pawls 240 can be biased to block rotation of the drum 232 in the direction that unwinds the anchor strap portions 222A and 222B. The retractor 223 can thereby suitably tension the anchor strap portions 222A and 222B to hold the seat shell 102 in place.

The retractor 223 may facilitate the installation of the child safety seat. After the two fasteners 124 are attached to the anchor structure of the vehicle, the caregiver can push down on the seating portion 104, which can form a slack of the anchor strap portions 222A and 222B. The retractor 223 then can wind the slack of the anchor strap portions 222A and 222B so that the strap assembly 221 can be properly tensioned. When the caregiver releases the seating portion 104, the retractor 223 can tightly hold the anchors strap portions 222A and 222B and the child safety seat 100 in place.

Figure 13:
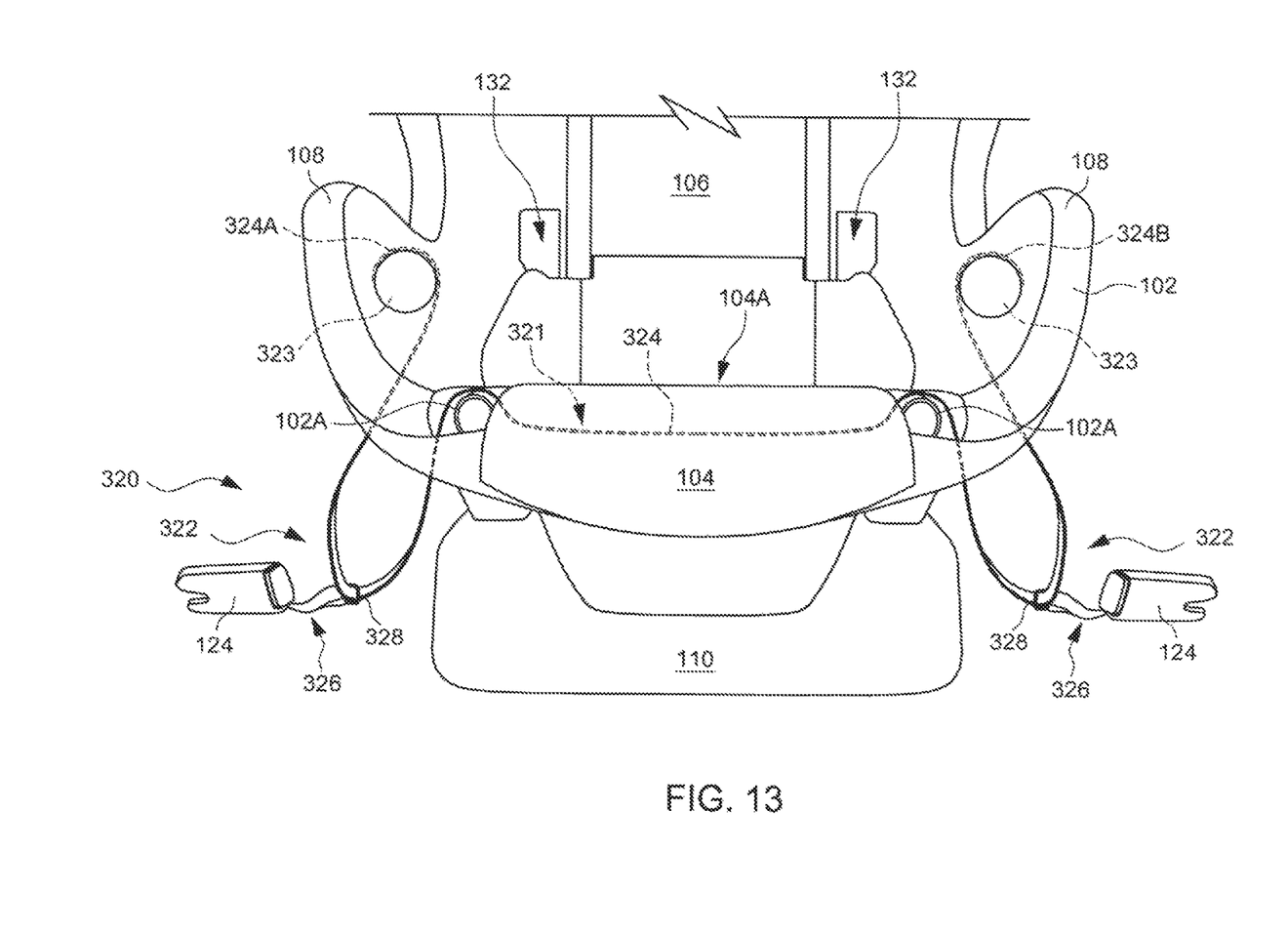
FIG. 13 is a schematic view illustrating another variant embodiment of a restraint system implemented in the child safety seat.

FIG. 13 is a schematic view illustrating another variant embodiment of a restraint system 320. The restraint system 320 can include two retractors 323 respectively assembled pivotally at the left and right sides of the seat shell 102. The retractors 323 can be disposed symmetrical to each other above the slots 128 and between the first and second openings 130 and 132. Each of the retractors 323 can be similar to the previously-described retractor 223 in construction.

In this embodiment, the strap assembly 321 of the restraint system 320 can include a strap 324 made of a continuous web material, and two extensions 326 movably connected with the strap 324. The strap 324 can be routed through the two slots 128 of the seat shell 102 in a transverse direction, and have first and second ends 324A and 324B respectively connected with the retractors 323 at the left and right sides of the seat shell 102. Each extension 326 can be affixed with one fastener 124 at one end while connected to a connector 328 at the other end. The strap 324 can movably pass through the connector 328, such that the extension 326 and the connector 328 can slide along the strap 324 outside the seat shell 102. Accordingly, the anchor strap portion 322 at each outer side of the seat shell 102 can include an extension 326 affixed with one fastener 124, and a portion of the strap 324 adjacent to the extension 326 and having one end assembled with the retractor 323. The fastener 124 can be slidably disposed on the anchor strap portion 322 between the slot 128 and retractor 323 located on the same side, such that the fastener 124 can slide between the slot 128 and the retractor 323. With this construction, the load that is exerted on each anchor strap portion 322 of the restraint system 320 when sudden stop or collision of the vehicle occurs can be distributed between the retractor 323 and the part of the strap 324 which is assembled in the seat shell 102. Strain concentration (in particular at the retractor 323) can be thereby prevented.

For installing the child safety seat, each retractor 323 can be unlocked, so that a portion of the strap 324 can be unwound from the retractor 323 as the anchor strap portion 322 is stretched out. Once the fasteners 124 are engaged with the anchor structure of the vehicle, the retractors 323 can act to properly tension the anchor strap portions 322, as described previously.

Figure 14:
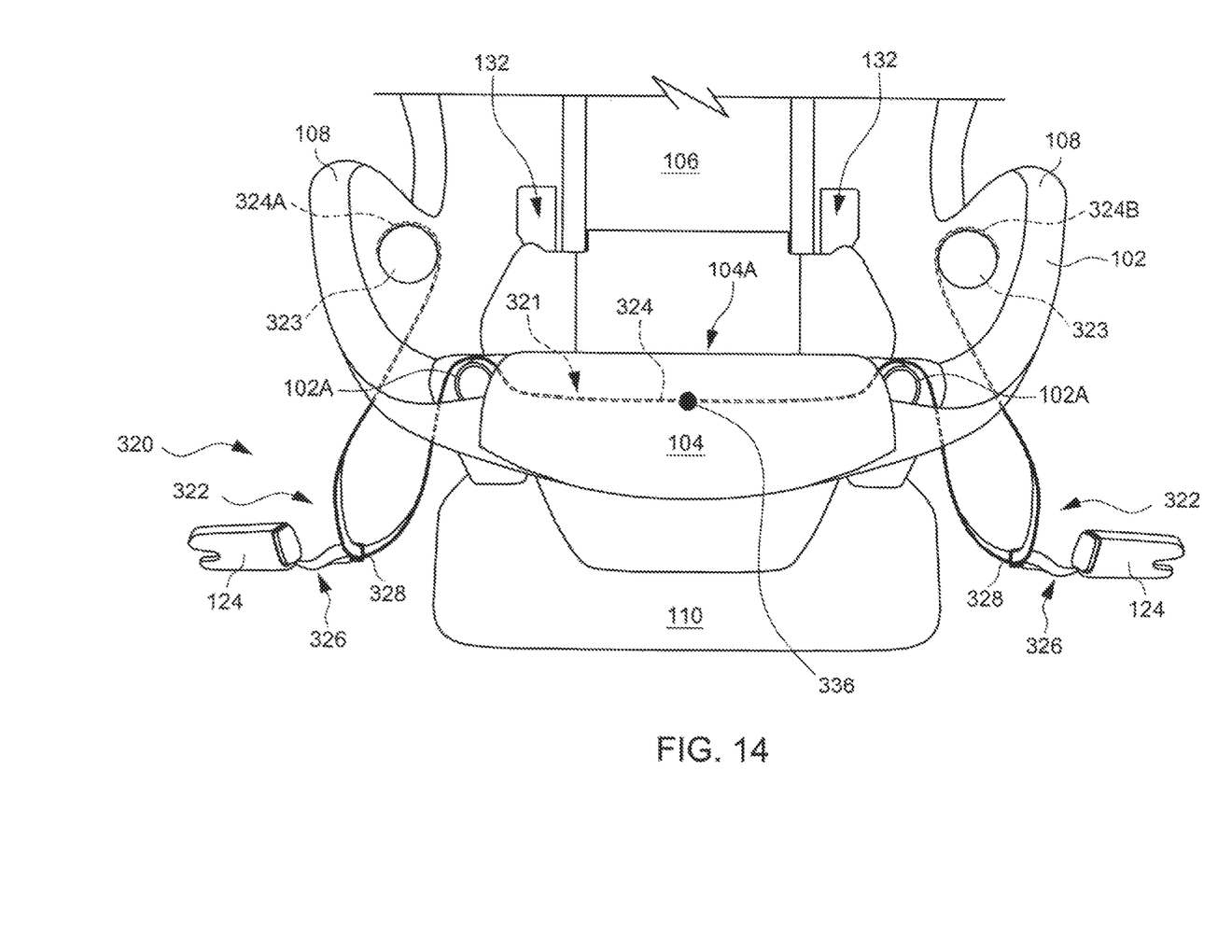
FIG. 14 is a schematic view illustrating a variant embodiment of the restraint system shown in FIG. 13.

FIG. 14 is a schematic view illustrating a variant embodiment of the restraint system 320. The strap assembly 321 of the restraint system 320 can include a strap 324 made of a continuous web material, and two extensions 326 movably connected with the strap 324. The strap 324 can have a central point affixed with the seat shell 102 via a connection point 336 such that the strap 324 cannot move relative to the seat shell 102. The connection point 336 can be disposed at a central location of the seat shell 102 between the first opening 130 and the second opening 132, and preferably at a center location between the two slots 128.

Like previously described, the strap 324 can be routed through the two slots 128 of the seat shell 102 in a transverse direction, and have first and second ends 324A and 324B respectively connected with the retractors 323 at the left and right sides of the seat shell 102. Each extension 326 can be formed by a connector 328 that is affixed with one fastener 124 and can slide along the strap 324 outside the seat shell 102. The anchor strap portion 322 at each outer side of the seat shell 102 can accordingly include an extension 326 affixed with one fastener 124, and a portion of the strap 324 adjacent to the extension 326 and having one end assembled with the retractor 323. With this construction, the fastener 124 can be slidably disposed on the anchor strap portion 322 between the associated slot 128 and retractor 323.

At least one advantage of the structures described herein is the ability to conveniently adjust the positions of the anchor strap portions according to the placement of the child safety seat in the vehicle, i.e., installed in a forward facing or rearward facing position. The anchor strap portions can be easily adjusted by pulling the strap portions along the seat shell toward its front or rear. Moreover, when provided with retractors, the length of the anchor strap portions can be easily adjustable through the retractors. Accordingly, the installation of the child safety seat in the vehicle can be facilitated.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child safety seat comprising:
   a seat shell having a side provided with an elongated slot;
   an anchor strap portion routed through the seat shell and movable back and forth along the elongated slot relative to the seat shell, the anchor strap portion extending through the elongated slot and being connected with a fastener operable to attach with an anchor structure provided in a vehicle; and
   a retractor disposed on the side of the seat shell, the anchor strap portion having one end assembled with the retractor, the fastener being connected with the anchor strap portion at a location that is between the elongated slot and the retractor along the anchor strap portion.

2. The child safety seat according to claim 1, wherein the retractor is pivotally assembled with the seat shell.

3. The child safety seat according to claim 1, wherein the elongated slot is located below the retractor.

4. The child safety seat according to claim 1, wherein the seat shell has a seating portion, and the elongated slot is located below an upper surface of the seating portion.

5. The child safety seat according to claim 1, wherein the elongated slot communicates with a first opening near a front of the seat shell, and a second opening near a rear of the seat shell, and the anchor strap portion is movable along the elongated slot between a first position adjacent to the first opening and a second position adjacent to the second opening.

6. The child safety seat according to claim 5, wherein the anchor strap portion extends outward from the first opening to attach the seat shell in a rearward facing configuration, and from the second opening to attach the seat shell in a forward facing configuration.

7. The child safety seat according to claim 1, wherein the fastener is movable along the anchor strap portion between the elongated slot and the retractor.

8. The child safety seat according to claim 1, wherein the anchor strap portion is at least partially defined from a strap that is routed transversally through the seat shell from a left side to a right side thereof, the strap extending outward at the left and right sides of the seat shell and being connected with the retractor.

9. The child safety seat according to claim 8, wherein the retractor is arranged on one of the left and right sides of the seat shell.

10. The child safety seat according to claim 9, wherein the retractor is arranged on the left side of the seat shell, and the right side of the seat shell is provided with another retractor, the strap having two opposite ends respectively connected with the two retractors, the strap further having a second anchor strap portion that extends outward at the right side and is connected with a second fastener operable to attach with an anchor structure of a vehicle.

11. The child safety seat according to claim 9, wherein the strap has a first and a second end, the first end of the strap being connected with the retractor at one of the left and right side of the seat shell, and the second end of the strap being connected with a second fastener at the other one of the left and right sides of the seat shell, the second fastener being operable to attach with an anchor structure of a vehicle.

12. A child safety seat comprising:
    a seat shell having a left and a right side, each of the left and right sides of the seat shell respectively having an elongated slot;
    a strap routed transversally through the seat shell and extending outward at the left and right sides, the strap being adjustable back and forth along the two elongated slots relative to the seat shell, the strap having an anchor strap portion that extends through a first one of the two elongated slots and is connected with a fastener that is operable to attach with an anchor structure provided in a vehicle; and
    a retractor connected with one of the left and right side of the seat shell, the strap having an end connected with the retractor, the fastener being connected with the anchor strap portion at a location that is between the first elongated slot and the retractor along the anchor strap portion.

13. The child safety seat according to claim 12, wherein the retractor is pivotally assembled with the seat shell.

14. The child safety seat according to claim 12, wherein the seat shell has a seating portion, and the two elongated slots are located below an upper surface of the seating portion.

15. The child safety seat according to claim 12, wherein the first elongated slot on the same side of the seat shell as the retractor is located below the retractor.

16. The child safety seat according to claim 12, wherein the strap is movable along the two elongated slots between a first position near a rear of the seat shell and a second position near a front of the seat shell.

17. The child safety seat according to claim 12, wherein the retractor is arranged on the left side of the seat shell, and the right side of the seat shell is provided with another retractor, the strap having two opposite ends respectively connected with the two retractors, the strap further having a second anchor strap portion that extends outward at the right side and is connected with a second fastener operable to attach with an anchor structure of a vehicle.

18. The child safety seat according to claim 12, wherein the strap has a first and a second end, the first end of the strap being connected with the retractor at one of the left and right sides of the seat shell, and the second end of the strap being connected with a second fastener at the other one of the left and right sides of the seat shell, the second fastener being operable to attach with an anchor structure of a vehicle.

* * * * *